(12) United States Patent
Plouse et al.

(10) Patent No.: US 11,592,111 B2
(45) Date of Patent: Feb. 28, 2023

(54) TORQUE RESISTANT SEAL

(71) Applicant: Caterpillar Inc., Deerfield, IL (US)

(72) Inventors: Loreena S. Plouse, Franklin, NC (US); Kenneth L. Crunkleton, Franklin, NC (US); Dennis M. Turczyn, Edelstein, IL (US); Benjamin J. Copple, Farmington, IL (US)

(73) Assignee: Caterpillar Inc., Peoria, IL (US)

( * ) Notice: Subject to any disclaimer, the term of this patent is extended or adjusted under 35 U.S.C. 154(b) by 876 days.

(21) Appl. No.: 16/452,210

(22) Filed: Jun. 25, 2019

(65) Prior Publication Data

US 2020/0406995 A1 Dec. 31, 2020

(51) Int. Cl.
*F16J 15/34* (2006.01)
*B62D 55/15* (2006.01)

(52) U.S. Cl.
CPC ......... *F16J 15/344* (2013.01); *F16J 15/3464* (2013.01); *B62D 55/15* (2013.01)

(58) Field of Classification Search
CPC .... F16J 15/344; F16J 15/3464; B62D 55/088; B62D 55/125; B62D 55/15
See application file for complete search history.

(56) References Cited

U.S. PATENT DOCUMENTS

| | | | |
|---|---|---|---|
| 4,183,542 A * | 1/1980 | Quartara | F16J 15/344 277/393 |
| 4,256,315 A | 3/1981 | Larson | |
| 4,421,327 A | 12/1983 | Morley et al. | |
| 4,560,174 A | 12/1985 | Bisi | |
| H1180 H * | 5/1993 | Arianoutsos | 277/390 |
| 6,186,511 B1 | 2/2001 | Anderson et al. | |
| 6,921,078 B2 * | 7/2005 | Zutz | F16J 15/344 277/358 |
| 6,976,681 B2 * | 12/2005 | Zutx | F16J 15/344 277/377 |

(Continued)

FOREIGN PATENT DOCUMENTS

| | | |
|---|---|---|
| EP | 2324209 | 8/2019 |
| WO | 9931411 | 6/1999 |

OTHER PUBLICATIONS

"Federal-Mogul Powertrain Mechanical Face Seals", OEM Off-Highway, Available https://www.oemoffhighway.com/drivetrains/hardware/seals-gaskets/product/20859794/federalmogul-powertrain-federalmogul-powertrain-mechanical-face-seals, Retrieved May 13, 2022, Published Apr. 18, 2017.*

(Continued)

*Primary Examiner* — Nicholas L Foster
(74) *Attorney, Agent, or Firm* — Schwegman, Lundberg & Woessner

(57) ABSTRACT

A torque-resistant dual face seal includes a seal ring having an L-shaped cross-section including an axially-extending flange and a radially-extending flange, the seal ring including an annular seal face and an opposing loading surface. The seal ring includes a plurality of deformations formed in a spaced apart arrangement circumferentially around the axially-extending flange. An axial cross-section through the axially-extending flange and intersecting one of the plurality of deformations includes a stepped geometry. The plurality of deformations allows a load ring to squeeze into the plurality of deformations to increase a surface area contact between the seal ring and the load ring.

13 Claims, 7 Drawing Sheets

(56) References Cited

U.S. PATENT DOCUMENTS

| | | |
|---|---|---|
| 8,770,675 B2 | 7/2014 | Vom Stein |
| 8,827,381 B2 * | 9/2014 | Dolata .................. B62D 55/15 |
| | | 277/402 |
| 9,353,866 B2 | 5/2016 | Jensen |
| 9,822,883 B2 * | 11/2017 | Antoine .................. F16J 15/36 |
| 2014/0131952 A1 | 5/2014 | Kirov et al. |
| 2017/0152951 A1 * | 6/2017 | Antoine ............... B62D 55/088 |

OTHER PUBLICATIONS

"Mechanical Face Seal Design", [Online]. Retrieved from the Internet: <www.federalmogul.com en-US OE Brands GoetzeSeals Pages Design-En.aspx>, (Accessed on Mar. 29, 2019), 3 pgs.

* cited by examiner

TORQUE RESISTANT SEAL

TECHNICAL FIELD

The present disclosure is directed generally, but not by way of limitation, to seal assemblies, and, more particularly to seal assemblies including metal face seals.

BACKGROUND

Machines used in earth moving, agricultural and construction applications are subjected to extreme wear. The moving components of such machines need to be provided with a constant supply of lubrication and do so while limiting the loss of that lubrication to the environment and inflow of debris from the worksite into the lubrication supply.

A seal assembly for retaining lubricant within a sealed cavity and excluding foreign matter from the bearing surfaces between relatively moving parts disposed within the sealed cavity can be used in various components of a machine. Seals are used, for example, in a final drive system, track rollers and idlers of an undercarriage. In some examples, such as in a final drive system, a seal assembly can include a dual face seal. A dual face seal can allow a seal to be created over a rotating shaft, such as a spindle, so that one side can remain stationary and the other side can rotate and still maintain an oil seal while keeping debris out.

Over the years, a number of different configurations have been used in an attempt to provide such lubrication while preventing the loss of the lubrication and inflow of debris, such as dirt, dust and moisture into the lubrication supply. There is a need for additional improvements in preventing loss of lubrication and the inflow of debris into a sealed assembly, especially when the machines are exposed to harsh environments and challenging terrain.

One attempt to address the issue of sealing assemblies to keep lubrication in and debris out is described in PCT Patent Publication No. WO 99/31411 to Anderson et al. and published on Jun. 24, 1999. The '411 publication describes a face seal assembly including a pair of conforming seal rings having mutually-engaging seal faces. The seal faces are maintained in sealing engagement by a pair of resilient load rings having annular surfaces which engage confronting annular surfaces on the seal rings. While the '411 publication provides an example of a face seal assembly design, there is room for improvement.

The present disclosure is directed to overcoming one or more of the shortcomings set forth above and/or other shortcomings in the art.

SUMMARY

In one aspect, the present disclosure relates to a dual face seal including a seal ring having an L-shaped cross-section including an axially-extending flange and a radially-extending flange. The seal ring has an axially-extending flange and a radially-extending flange defined by a large outer diameter, a small outer diameter and an inner diameter. The seal ring further includes an annular seal face and an opposing loading surface. The annular seal face is configured to seal against a second seal ring in a dual face seal assembly. The loading surface is configured to receive a load ring. The loading surface includes a plurality of deformations formed in a spaced apart arrangement circumferentially around the axially-extending flange. An axial cross-section through the seal ring and intersecting one of the plurality of deformations includes a stepped geometry such that the small outer diameter has a first small diameter section and a second small diameter section, wherein a first diameter of the first small diameter section is smaller than a second diameter of the second small diameter section.

In another aspect, the present disclosure relates to a dual face seal assembly including a first seal ring and a second seal ring each having an L-shaped cross-section. Each of the first and second seal rings includes an axially-extending flange and a radially-extending flange defined by a large outer diameter, a small outer diameter and an inner diameter, and having mutually-confronting annular seal faces and opposing loading surfaces. A first load ring and a second load ring correspond to one of the first seal ring and the second seal rings, respectively. Each of the first and second load rings has an inner annular cylindrical surface configured to engage and apply a force to the loading surface of the corresponding first or second seal ring to maintain the seal faces in sealing engagement. The first and second seal rings each include a plurality of deformations formed in a spaced apart arrangement circumferentially around the loading surfaces in the axially-extending flanges. An axial cross-section through the axially-extending flange and intersecting one of the plurality of deformations includes a stepped geometry having a first small diameter section and a second small diameter section. A first diameter of the first small diameter section is smaller than a second diameter of the second small diameter section.

In yet another aspect, the present disclosure relates to a final drive system including a rotatable mount including a spindle, a final drive housing configured to receive the spindle and be mounted to a frame of a machine, and a dual face seal assembly. The dual face seal assembly includes a first seal ring and a second seal ring each of the first and second seal rings having an L-shaped cross-section including an axially-extending flange and a radially-extending flange. Each of the first and second seal rings defined by a large outer diameter, a small outer diameter, and an inner diameter, and having mutually-confronting annular seal faces and opposing loading surfaces. The assembly further including a first load ring and a second load ring, each corresponding to one of the first seal ring and the second seal ring, respectively. Each of the first and second load rings having an inner cylindrical surface configured to engage and apply a force to the loading surface of the corresponding first or second seal ring to maintain the seal faces in sealing engagement. Each seal ring includes a plurality of deformations formed in a spaced apart arrangement circumferentially around each loading surface in the axially-extending flange such that an axial cross-section through the axially-extending flange and intersecting one of the plurality of deformations includes a stepped geometry having a first small diameter section and a second small diameter section, wherein a first diameter of the first small diameter section is smaller than a second diameter of the second small diameter section.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Figure 1:
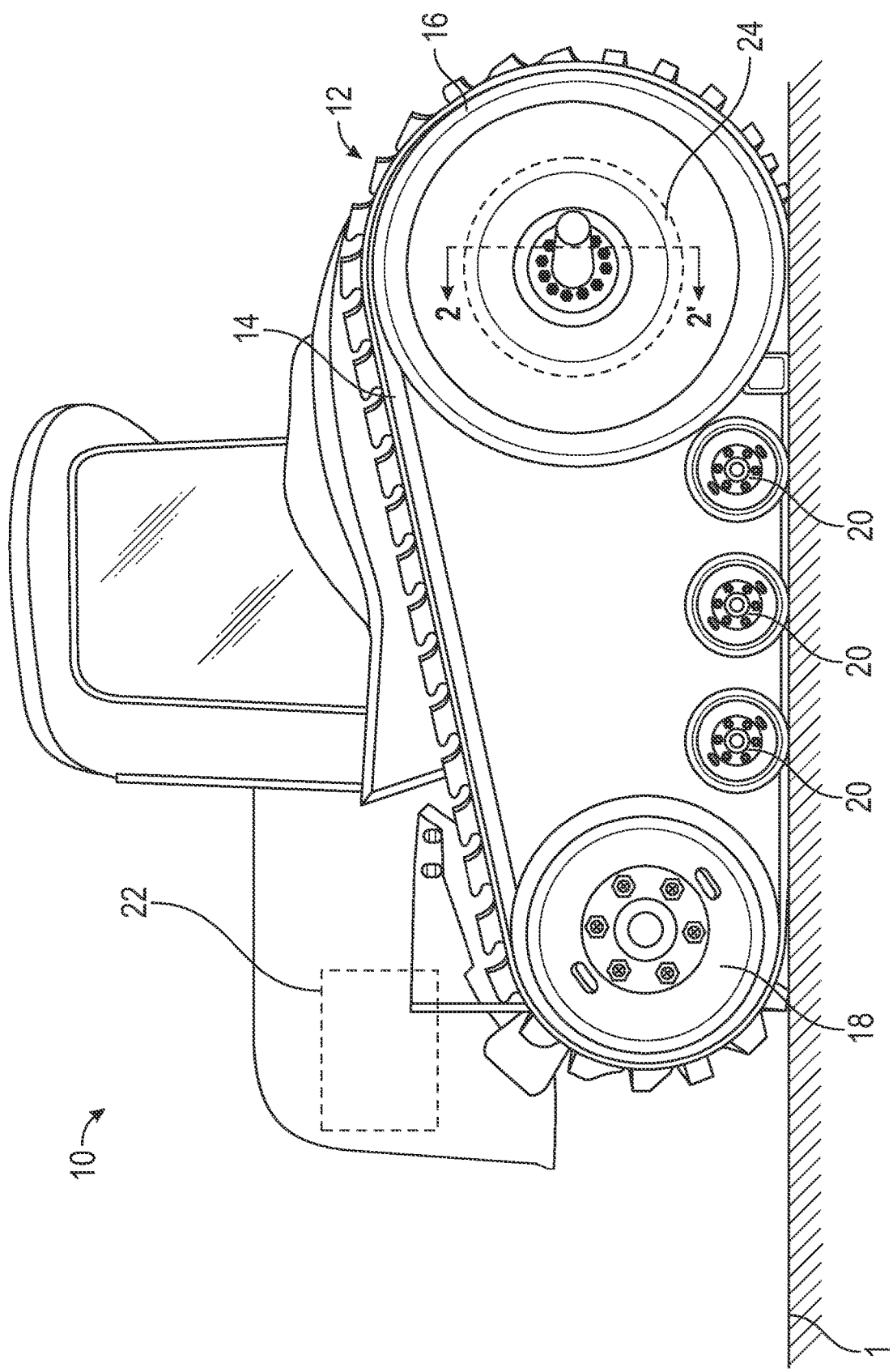
FIG. 1 is a side elevational view of a track-type machine which can include a seal assembly, in accordance with at least one example.

Various examples of dual face seal assemblies having a rotary face-to-face contacting relationship via a pair of seal rings and including an improved seal ring to load ring interface are described herein. Examples described in this disclosure prevent spinning, leaking, galling and packing in the seal assembly. In addition to preventing damage, the examples described herein can also prevent debris from entering the seal.

The seal assemblies described herein minimize failures by increasing contact area and grip between a load ring having an inner cylindrical surface and a seal ring having deformations in a loading surface to improve the ability to hold to a torque between the load ring and the seal ring.

Reference will now be made in detail to embodiments of the disclosure, examples of which are illustrated in the accompanying drawings. The same reference numerals generally refer to the same or like components throughout the drawings. Relative terms, such as, "substantially" or "about" are used to indicate a possible variation, for example, of ±10% in a stated numeric value. As defined herein, the use of the terms "or" or "and" includes "or", "and" or "and/or".

FIG. 1 illustrates a side elevational view of machine 10 which can include a seal assembly, in accordance with at least one example. Machine 10 can include a track-type drive system including a pair of continuous tracks 14 trained around a drive sprocket 16, an idler 18 and rollers 20, which in combination form an undercarriage. To cause the track-type drive system 12 to move the machine 10, a motor 22 transfers rotational motion to a final drive system 24 which causes the drive sprocket 16 (e.g., wheel mount) to rotate. Rotation of the drive sprocket 16 causes the continuous tracks 14 to move around the drive sprocket 16, idler 18 and rollers 20, enabling movement of the machine 10 relative to a ground surface 1. The motor 22 can be any suitable type of power source known in the art, including, but not limited to a diesel-powered, gas-powered, or natural gas-powered engine. The motor can also include electric powered, or hybrid power systems.

In various examples, the machine 10 can be any suitable machine, such as a general-purpose machine, a tractor such as an agricultural tractor, a skid steer loader, a tracked vehicle such as a military tracked vehicle, a wheel loader, a backhoe, an excavator, a material handler and the like. The machine can also be a stationary machine. While the machine 10 is illustrated in the context of a track-type machine, it should be appreciated that the present disclosure is not thereby limited, and that a wide variety of other machines, both those with tracks and without tracks can include features of the seal assemblies described herein.

Figure 2:
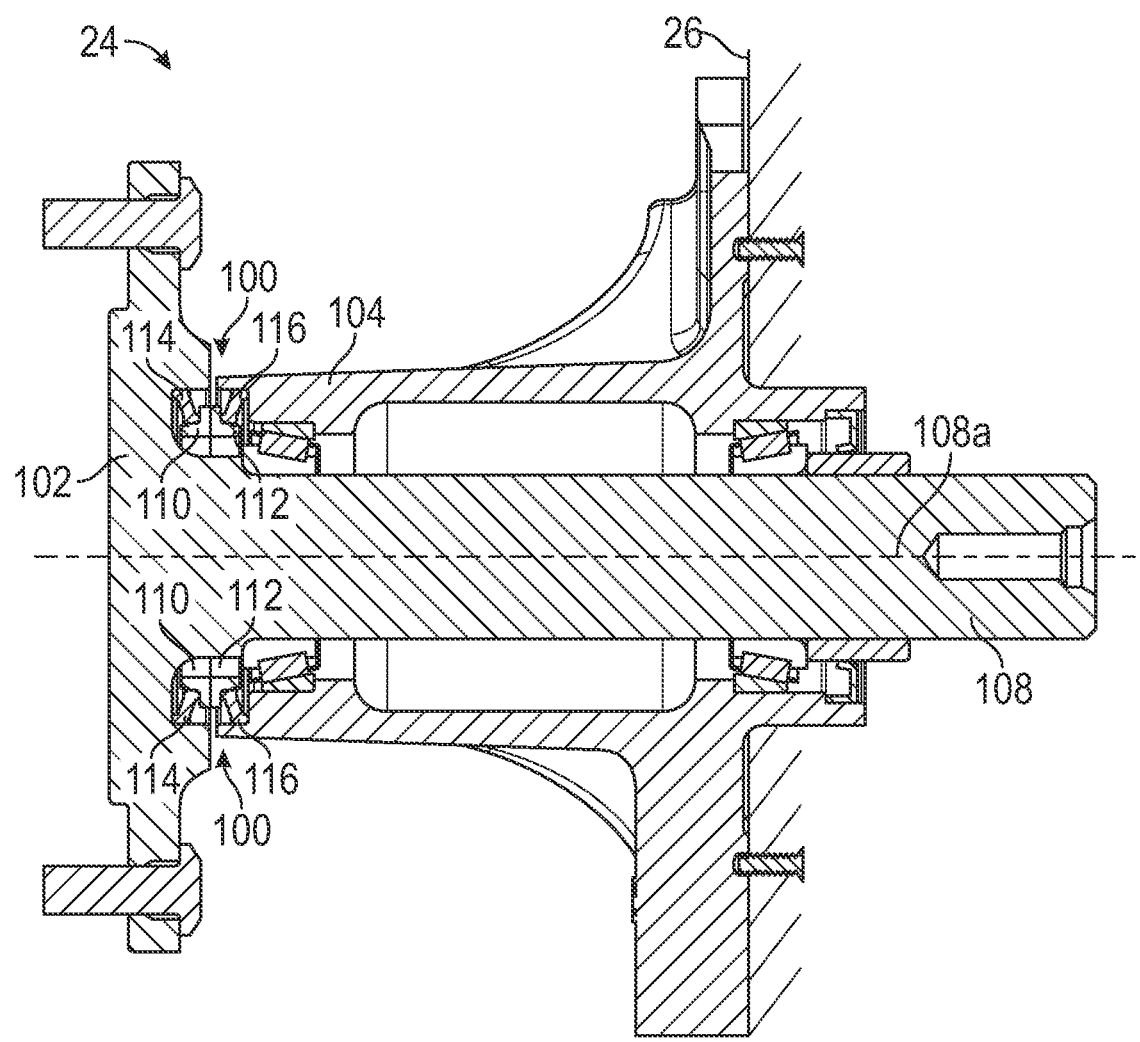
FIG. 2 is a cross-sectional view of a final drive system taken along line 2-2' in FIG. 1 (e.g., through an axis of a spindle of a final drive) and suitable for use with the machine of FIG. 1, in accordance with at least one example.

FIG. 2 illustrates a cross-sectional view of the final drive system 24 of the machine 10 of FIG. 1 taken along line 2-2' (e.g., through a longitudinal axis 108a of a spindle 108), in accordance with at least one example. FIG. 2 shows an example of a dual face seal assembly 100 constructed according to principles of the present disclosure that can provide a seal between a first member 102, which in the illustrated example includes a first rotating member such as a drive sprocket 16 or tire mount, and a second non-rotating member 104, which in the illustrated example includes a housing, such as a final drive housing, that is bolted to the machine 10.

The seal assembly 100, which in the illustrative example is a metal-to-metal face seal assembly 100 (e.g., dual face assembly), is disposed in a seal cavity 106 (FIG. 4) extending between the first member 102 and the second member 104. In an example, the seal assembly 100 can be used to retain lubricant within the seal assembly 100 and to prevent dirt and other contaminants from entering the seal assembly 100.

While the present disclosure may be implemented in the context of a final drive system 24 for a track-type machine 10, it is not thereby limited. In other examples, a seal assembly constructed according to the principles of the present disclosure can be used in other applications where rotatory seal assemblies are used.

The first and second members 102, 104 are rotatable relative to one another about a longitudinal axis 108a of a shaft 108 (e.g., spindle) with the seal assembly 100 providing a means for fluidly sealing the first member 102 and the second member 104 with a running seal therebetween. In an example, the second member 104 can include a component mounted to a frame 26 of the machine 10 or otherwise stationary with respect to the frame 26, and the first member 102 can comprise a component which is rotatably movable with respect the second member 104 about the longitudinal axis 108a. In other examples, the first member 102 can be stationary and the second member 104 can be rotatable with respect to the frame 26. The use of the terms "first", "second" and the like is used for convenient reference and is not limiting in any way.

Figure 4:
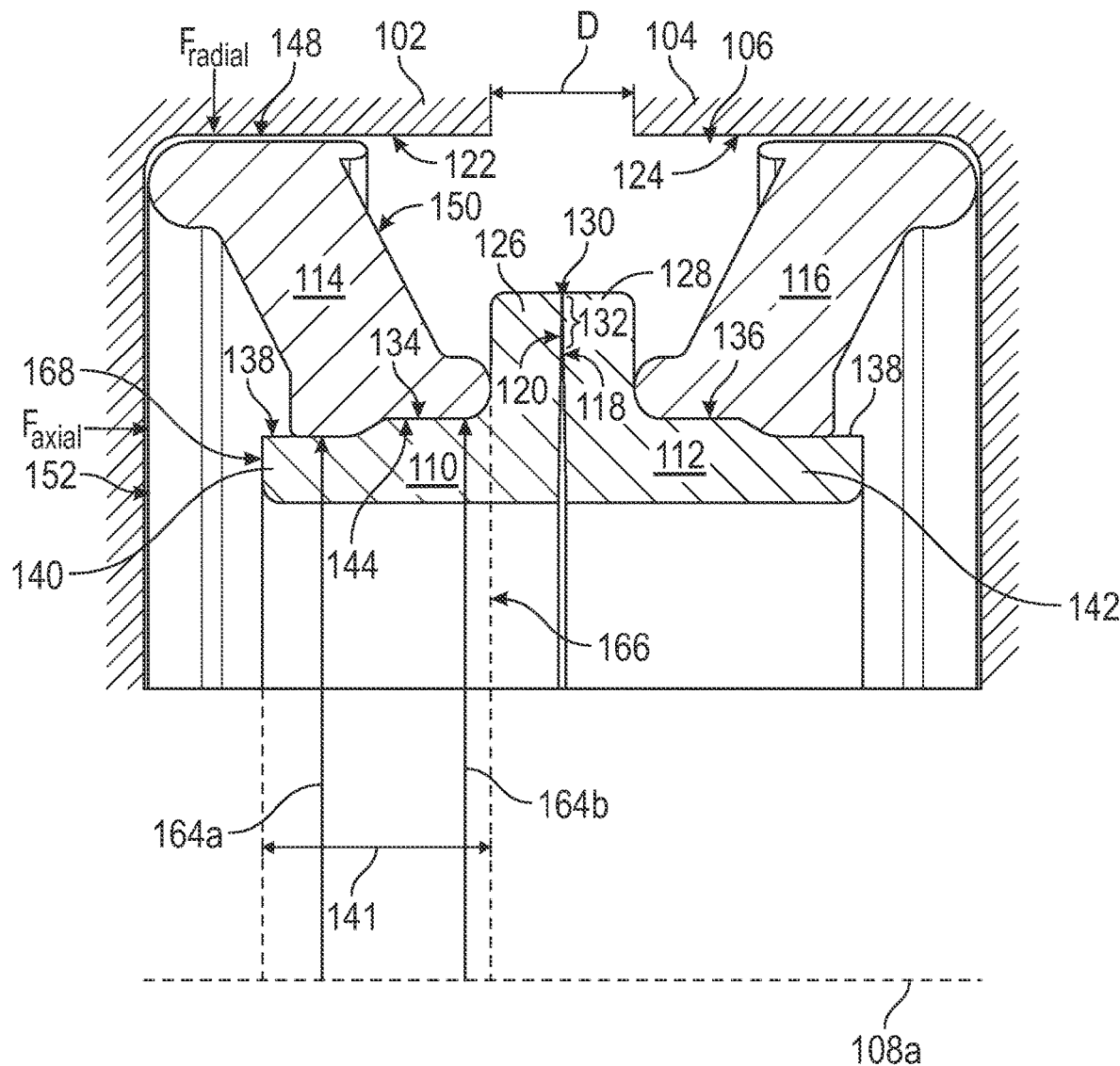
FIG. 4 is a close-up view of a portion of the seal assembly of FIG. 3 but as compressed within the final drive system of FIG. 2, in accordance with at least one example.

The first member 102 is rotatable about the longitudinal axis 108a with respect to the second member 104. The first member 102 and the second member 104 can be disposed in a spaced apart relationship and adjacent one another along the longitudinal axis 108a such that they are separated by a seal gap distance D (FIG. 4). During use, the first member 102 and the second member 104 can move axially with respect to each other along the longitudinal axis 108a, thereby varying the seal gap distance D a specified amount.

The seal assembly 100 includes first and second seal rings 110, 112 and first and second load rings 114, 116, which are all annular. The first and second seal rings 110, 112 and the first and second load rings 114, 116 are disposed in the seal cavity 106 between the first member 102 and the second member 104. The first and second seal rings 110, 112 of the seal assembly 100 are disposed in abutting relationship with each other.

As described herein, the first and second seal rings 110, 112 can be substantially identical to each other. Therefore, the description of the first seal ring 110, 112 is applicable to the second seal ring as well. Like the first and second seal rings 110, 112, the first and second load rings 114, 116 can also be substantially identical to each other. Therefore, the description of the first load ring 114 is applicable to the second load ring 116 as well. However, in some examples, the seal rings 110, 112 may not be identical and the load rings 114, 116 may not be not identical.

The first and second load rings 114, 116 are respectively mounted to the first and second seal rings 110, 112. The first and second seal rings 110, 112 can be made from any suitable material, such as, but not limited to, metal, a metal alloy, a ceramic material and combinations thereof. The first and second load rings 114, 116 can be made from a suitable elastomeric material such as, but not limited to nitrile, silicone, or a fluoroelastomer, and combinations thereof.

The seal assembly 100 provides a dual face seal in the form of first and second seal rings 110, 112. In the seal assembly 100, the first load ring 114 acts as a gasket and sealingly engages the first member 102 and the first seal ring 110 to provide a fluid-tight seal therebetween. The second load ring 116 acts as a gasket and sealing engages the second member 104 and the second seal ring 116 to provide a fluid tight seal therebetween.

Figure 3:
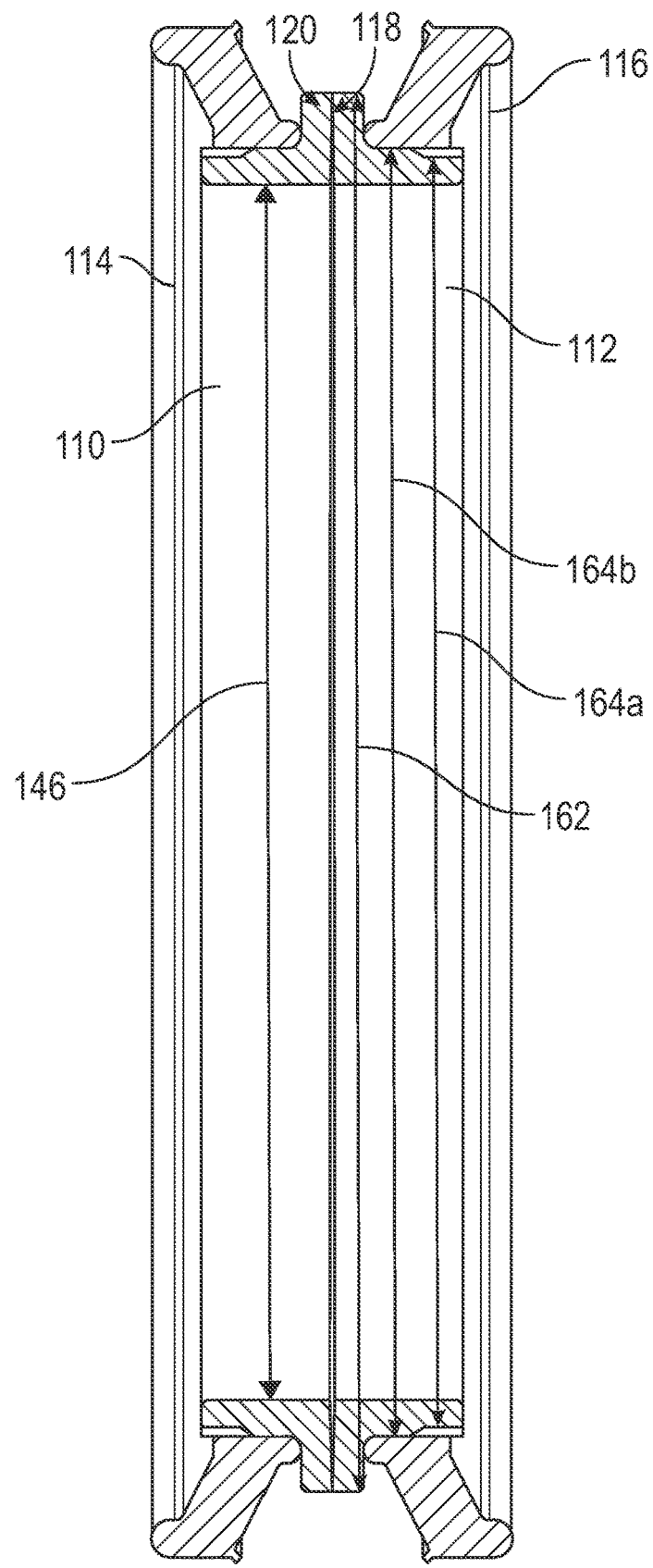
FIG. 3 is a cross-sectional view of a portion of the seal assembly of FIG. 2 taken along line 2-2' in FIG. 1, in accordance with at least one example.

FIG. 3 illustrates a cross-sectional view of the first and second seal rings 110, 112 and first and second load rings 114, 116 taken along line 2-2' in FIG. 2, in accordance with at least one example. The first and second seal rings 110, 112 can each be in the form of an annulus. The first seal ring 110 and the second seal ring 112 can abut one another such that seal faces 118, 120 of the first seal ring 110 and the second seal ring 112 are in contacting relationship with each other.

To maintain a strong seal assembly, it is beneficial to keep the first seal ring 110 and the first load ring 114 in a fixed relationship with each other and the second seal ring 112 and the second load ring 116 in a fixed relationship with each. To provide rotation of the first member 102 relative to the second member 104, the first seal ring 110 and the second seal ring 112 rotate relative to one another with the closest point of contact being along the first and second seal faces 118, 120.

FIG. 4 illustrates a close-up view of a portion of the example seal assembly of FIG. 2. Each of the first member 102 and the second member 104 includes a load ring engagement surface (first and second load ring engagement surfaces 122, 124). The load ring engagement surfaces 122, 124 of the first member 102 and the second member 104 define, at least in part, the seal cavity 106, which extends axially along the longitudinal axis 108a between the first member and the second member.

The load ring engagement surfaces 122, 124 are generally annular and are coaxial with the longitudinal axis 108a. In the illustrated example, the load ring engagement surfaces 122, 124 each maintains the respective cross-sectional shape shown in FIG. 2 substantially continuously over the entire circumference circumscribed around the longitudinal axis 108a by the first and second members 102, 104.

As described with reference to seal ring 110 in FIG. 4, each seal ring 110, 112 has an L-shaped cross-section including an axially-extending flange 140 and a radially extending flange 126. Each seal ring 110, 112 is defined by a large outer diameter 162, a small outer diameter 164a/b and an inner diameter 146. Each seal ring 110, 112 further includes an annular seal face 118, 120 and an opposing loading surface 134, 136 which is configured to receive the corresponding first or second load ring 114, 116.

Each of the seal faces 118, 120 are defined by the radially-extending flange 128 which extends radially away from the longitudinal axis 108a of shaft 108 (shaft 108 not fully shown in FIG. 4, also see FIG. 3). The seal faces 118, 120 of the first and second seal rings 110, 112 form a radially-extending annulus and are in a sealing relationship with each other. Each seal face 118, 120 can extend radially to an outer perimeter 130. The first and second seal rings abut one another such that at least a portion of the first and second seal rings 110, 112 are in contacting relationship with each other to define a band 132 of contact between the seal faces 118, 120.

Axial loading of the first and second seal rings 110, 112 along the longitudinal axis 108a is accomplished by means of the first and second load rings 114, 116. The first and second load rings 114, 116 resiliently support the first and second seal rings 110, 112, respectively. First and second loading surfaces 134, 136 are formed along the first and second seal rings 110, 112 to receive the first and second load rings 114, 116, respectively. The first loading surface 134 is formed by radially-extending flange 126 and an axially-extending flange 140. The second loading surface 136 is formed by the radially-extending flange 128 and a second axially-extending flange 142. In this arrangement, the first load ring 114 engages the first loading surface 134 of the first seal ring 110, and the second load ring 116 engages the second loading surface 136 of the second seal ring 112.

The load ring engagement surface 122 of the first member 102 and the loading surface 134 of the first seal ring 110 are in confronting, spaced apart relationship such that they compress the first load ring 114 therebetween when in an assembled state (e.g., compressed state). The load ring engagement surface 124 of the second member 104 and the loading surface 136 of the second seal ring 112 are in confronting, spaced apart relationship such that they compress the second load ring 116 therebetween when in the assembled state.

In other words, the load ring engagement surfaces 122, 124 of the first and second members 102, 104 are positioned in corresponding confronting (e.g., opposing) relationship with respect to the loading surfaces 134, 136 of the first and second seal rings 110, 112 so as to contain and compress the first and second load rings 114, 116 therebetween. Axial loading of the first and second seal rings 110, 112 is thus accomplished through the axial loading of the first and second load rings 114, 116 by the first and second members 102, 104.

The first and second load rings 114, 116 resiliently support the first and second seal rings 110, 112 and drive the seal faces 118, 120 of the first and second seal rings 110, 112 together to define the band 132 of contact between the seal rings 110, 112. The first and second load rings 114, 116 act in the manner of a spring to apply an axial load respectively against the first and second seal rings 110, 112 in opposing directions along the longitudinal axis 108a to bring the seal faces 118, 120 of the first and second seal rings 110, 112 into face-to-face sealing contact under pressure along the band 132 of contact such that a running, fluid tight seal is formed.

As shown in FIG. 4, and as described with reference to load ring 114, each of the load rings 114, 116 can include an inner cylindrical surface 144 and an outer cylindrical surface 148 that are concentrically disposed about the longitudinal axis 108a. In some examples, both the inner cylindrical surface 144 and the outer cylindrical surface 148 of the load ring 114 can be substantially parallel to the longitudinal axis 108a and/or each other and extend axially. The load rings 114, 116 can extend in an axial direction from an inner radial surface 150 to an outer radial surface 152.

The first and second seal rings 110, 112 are rotatably movable with respect to each other about the longitudinal axis 108a. In this arrangement, the second seal ring 112 can be considered a stationary seal ring as it is rotatably coupled through the second load ring 116 with the second member 104. In contrast, the first seal ring 110 can be considered a rotational seal ring as it is coupled through the first load ring 114 with the first member 102. In the example, the first member 102 can be a sprocket or wheel mount 16 (FIG. 1) that is rotatably mounted to the second member 104 such that the sprocket or wheel mount 16 can rotate about the longitudinal axis 108a relative to the second member 104.

As shown in FIG. 4, the first load ring 114 engages the first loading surface 134 of the first seal ring 110, and the second load ring 116 engages the second loading surface 136 of the second seal ring 112. To ensure a long-life and good performance of the seal assembly 100, it is important to prevent rotation (e.g., spinning) of the first load ring 114 relative to the first seal ring 110 at the first loading surface 134. Likewise, it is important to prevent rotation of the second load ring 116 relative to the to the second seal ring 112 at the second loading surface 136.

However, there continue to be challenges with preventing rotation in conventional seal assemblies. To improve seal assembly 100 performance and reduce the occurrence of rotation between the first load ring 114 and the first seal ring 110, and likewise between second load ring 116 and second seal ring 112, improved grip and resistance to torqueing at the loading surfaces 134, 136 and the load ring engagement surfaces 122, 124, is desired.

Figure 5:
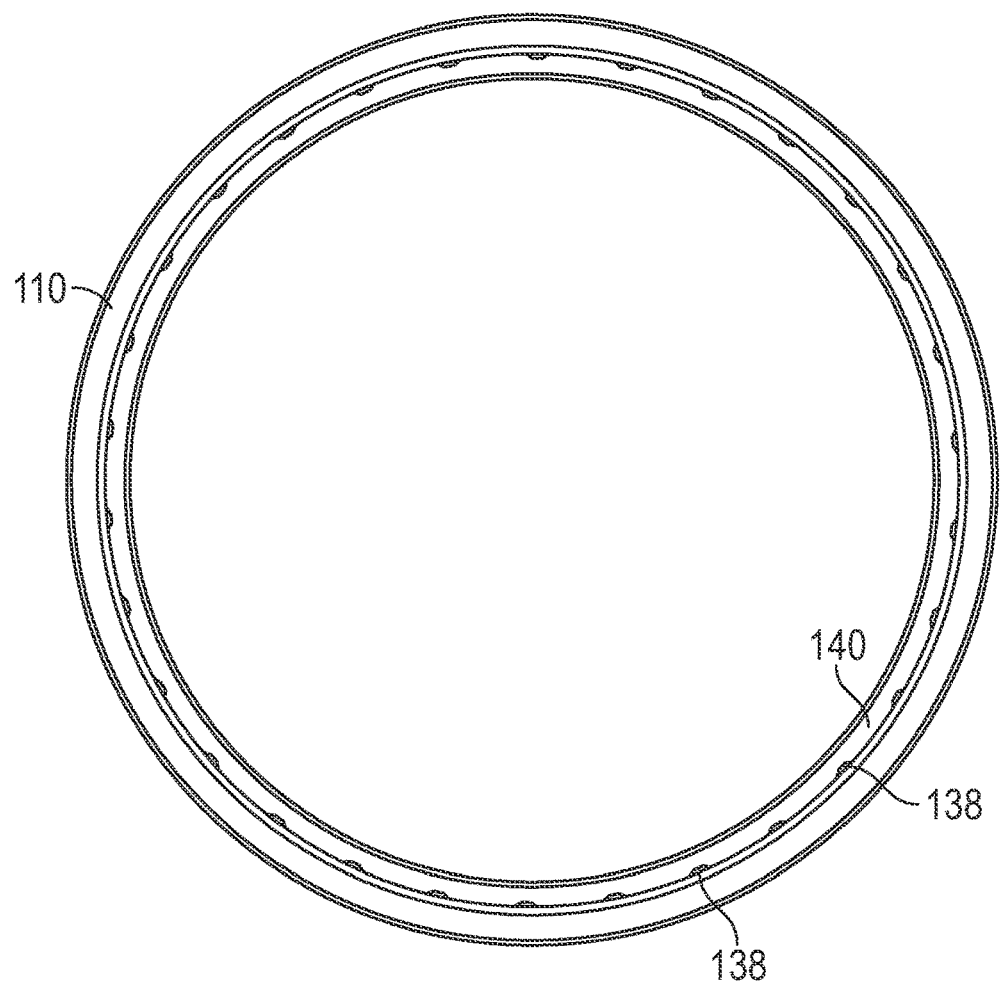
FIG. 5 is an axial view of the seal ring of FIG. 2, in accordance with at least one example.
Figure 6:
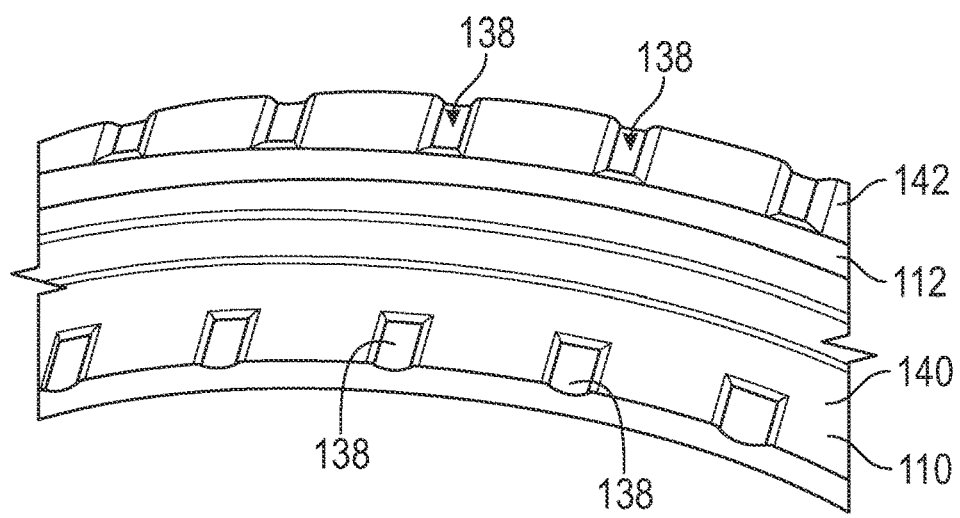
FIG. 6 is a perspective view of a portion of the seal ring of FIG. 5, in accordance with at least one example.

As shown in the cross-section of FIG. 4 and with support from FIGS. 5 and 6 which depict axial and perspective views of the seal rings 110, 112, to improve grip and sealing at the loading surfaces 134, 136 (FIG. 4), a plurality of deformations 138 can be formed in spaced apart arrangement circumferentially around the seal rings 110, 112. The deformations 138 can be formed in the loading surfaces 134, 136 of the axially-extending flanges 140, 142. As illustrated in seal ring 110, the axially-extending flange 140 can extend a length 141 from an inner end 166 to an outer end 168. In some examples, an axial cross-section through the axially-extending flange 140 and through one of the deformations 138 can be described as including a stepped geometry or stepped diameter along the axially-extending flange 140.

In the example of FIG. 4, and as described with reference to seal ring 110, the stepped geometry can be described as the first loading surface 131 having a stepped small outer diameter. The stepped small outer diameter can include a first small outer diameter 164a and a second small outer diameter 164b (FIG. 3). Both the first and second small outer diameters 164a, 164b can be considered small compared to large outer diameter 162 of the radially-extending flange 126.

In some examples, and as shown in FIGS. 5-6, the deformations 138 can be located distal from the radially extending flange 126 proximate the outer end 168. In other examples, the deformations 138 can be positioned in another location along the length 141 of the axially-extending flange 140. For example, the deformations 138 could be located proximate the radially-extending flange 126. In some examples, the first small outer diameter 164a can extend between 25-75% of the length 141 of the axially-extending flange 140. In some examples the second small outer diameter 164b can extend 25-75% of the length of the axially-extending flange 140. In some examples, each of the first small outer diameter 164a and the second small outer diameter 164b extends about 50% of the length 141 of the axially-extending flange 140 (each being within a range of ±20%, or possibly more preferably within a range of ±10%). The interaction of the deformations 138 in the seal rings 110, 112 and the interaction with the load rings 114, 116 will be described further in FIGS. 5-9.

In the illustrative example, the load rings 114, 116 have a smooth inner cylindrical surface 144 defined by a constant diameter 146 (e.g., substantially constant). The example load ring 114, 116 does not include complementary deformations along the inner cylindrical surface 144 of the load rings 114, 116 to interface with deformations 138 in the seal rings 110, 112. Rather, in the illustrated example, the load rings 114, 116 can include an inner cylindrical surface 144 having constant diameter 146 (FIG. 3) and a uniform inner cylindrical surface 144 dimension, or at least a uniform inner cylindrical surface 144 in the region of the load ring 114, 116 that interfaces with the deformations 138 in seal ring 110, 112. In some examples, the load ring 114, 116 may not have a completely uniform inner diameter 146 (FIG. 3), but any deformations or non-uniformity that is present in the load rings 114, 116 does not necessarily interface in a complementary shape and manner with the deformations 138 in the seal rings 110, 112.

Since the illustrative load rings 114, 116 in some examples do not include complementary geometry to fill the deformations 138 in the seal rings 110, 112, when the load rings 114, 116 are loaded onto the seal rings 110, 112 and compressed in an assembled state (FIG. 4, FIG. 9) by the first and second members 102, 104, the load rings 114, 116 are compressed against the seal rings 110, 112. Under the compressive force of the first and second members 102, 104, portions of the load rings 114, 116 are distorted and deformed into (e.g., protrude into, squeeze into) the deformations 138. This interface between the respective load rings 114, 116 and the seal rings 110, 112 can improve grip and sealing and reduce tearing of load rings 114, 116 over conventional seal assemblies.

FIG. 5 illustrates an axial view of the example seal rings 110, 112 (112 is hidden from view) of FIG. 2, while FIG. 6 is a perspective view of a portion of the seal rings 110, 112. Both FIGS. 5 and 6 show the deformations 138 in greater detail. As defined herein, deformations 138 are understood to mean features which recess into a defined surface or extend outward away from a defined surface. The defined surface can include for example, a ring shape, such as the loading surface of the seal rings 110, 112. In FIGS. 5 and 6, the deformations 138 are shown as depressions, however the deformations 138 can also include raised deformations.

Figure 7:
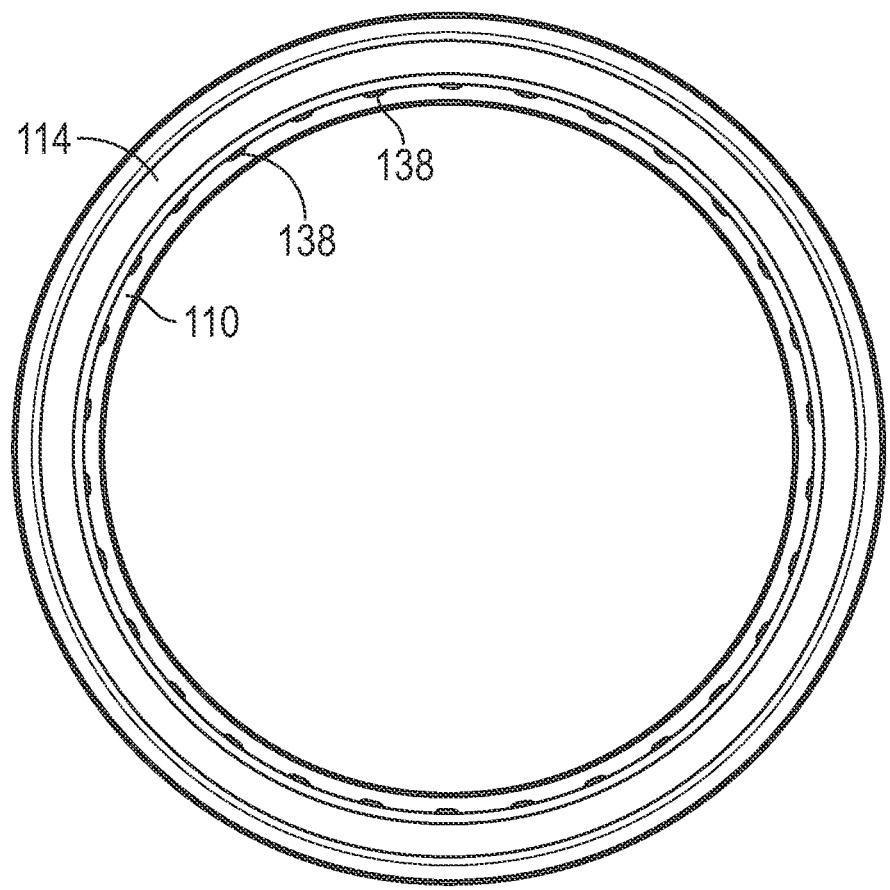
FIG. 7 is an axial view of the load ring and seal ring of FIG. 2 in an uncompressed state, in accordance with at least one example.
Figure 8:
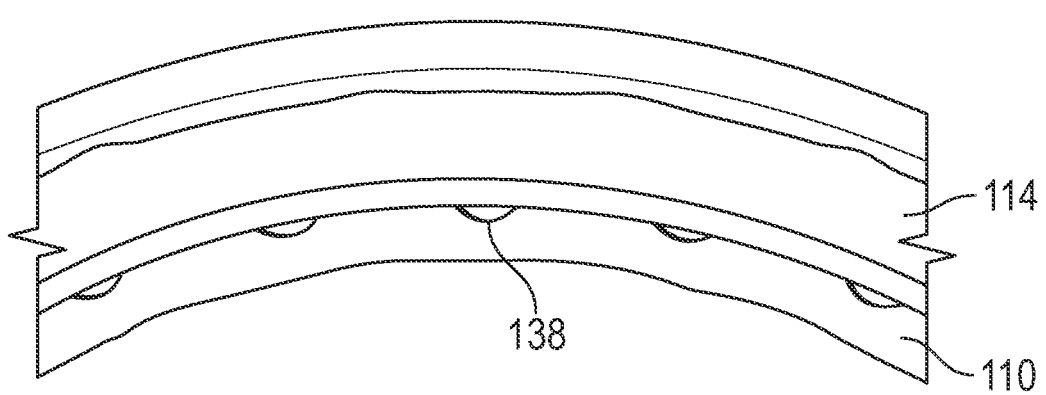
FIG. 8 is a close-up axial view of a portion of the load ring and seal ring of FIG. 7 in an uncompressed state, in accordance with at least one example.

FIG. 7 illustrates an axial view of the example load ring 114 and seal ring 110 of FIG. 2 in an uncompressed state. FIG. 8 illustrates a close-up view of a portion of FIG. 7. FIGS. 7 and 8 both illustrate how the load ring 114 may not include deformations that extend into the deformations 138 in the seal ring 110.

Figure 9:
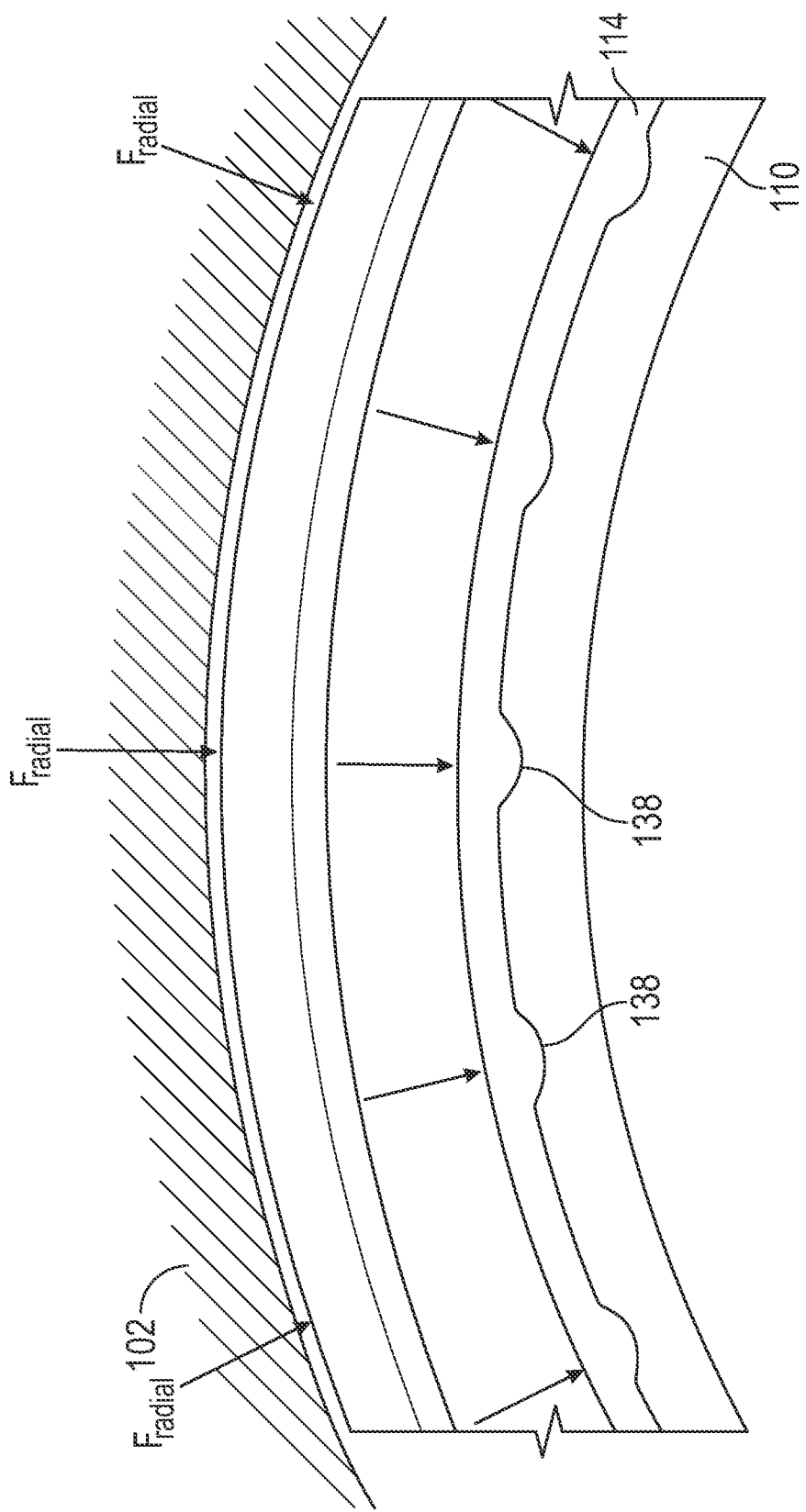
FIG. 9 is a close-up axial view of a portion of the load ring and seal ring of FIG. 7 in a compressed state, in accordance with at least one example.

FIG. 9 illustrates a close-up view of the load ring 114 and seal ring 110 of FIGS. 7 and 8, but in an assembled (e.g., compressed state). In the compressed state, the load ring 114 is distorted such that the load ring 114 extends into and fills a portion of the deformations 138 in the seal ring 110. The distortion (e.g., squeezing, pushing, stretching) of the load ring 114 under compression, applied by radial force $F_{radial}$ (FIGS. 4 and 9) and $F_{axial}$ (FIG. 4), increases the surface area of the load ring 114 that is in contact with the seal ring 110. In this arrangement, grip between the load ring 114 and the seal ring 110 are improved because the amount of surface area of the load ring 114 that is in contact with the seal ring 110 is increased. One benefit of an example including providing the load ring 114 without complementary deformations is that there are no small features extending radially inward from the load ring 114 towards the seal ring 110 that can be sheared off under torque between the load ring 114 and seal ring 110.

INDUSTRIAL APPLICABILITY

In general, the foregoing disclosure finds utility in various industrial applications, such as in a seal assembly 100 of a final drive system 24 for a track type vehicle 10, as is shown and described with reference to FIGS. 1-9. The seal assembly 100 can be used to provide a rotating seal over a spindle 108 at the connection between a final drive housing (e.g., second member 104) that is mounted to a frame 26 of the track-type vehicle 10 and a rotating drive sprocket or wheel mount (e.g., first member 102).

Some benefits of the seal assemblies 100, including seal rings 110, 112 and load rings 114, 116 described herein include an improvement in torque resistance in a dual face seal assembly. The dual face seal assembly can be configured to allow an elastomeric load ring 114 disposed between the seal ring 110 and the final drive housing 104, to squeeze into a plurality of deformations 138 in the seal ring 110 and to form more bonding over a larger surface area than the unstressed surface area of the load ring 114, thus providing resistance to spinning of the load ring 114 relative to either the seal ring 110 or the final drive housing 104.

It will be apparent to those skilled in the art that various modifications and variations can be made. Other embodiments will be apparent to those skilled in the art from consideration of the specification and the practice of the disclosed machine. It is intended that the specification and examples be considered as exemplary only, with a true scope being indicated by the claims and their equivalents.

What is claimed is:

1. A seal ring comprising:
an L-shaped cross-section including an axially-extending flange and a radially-extending flange, the seal ring being defined by a large outer diameter, and an inner diameter, and comprising an annular seal face and an opposing loading surface,
wherein the annular seal face is configured to seal against a second seal ring in a dual face seal assembly,
wherein the loading surface is configured to receive a load ring and comprises a plurality of deformations formed in a spaced apart arrangement circumferentially around the axially-extending flange and forming a stepped geometry when viewed in a cross-section through the deformations where the plurality of deformations are each defined by a first small outer diameter and a portion of the loading surface is defined by a second small outer diameter greater than the first small outer diameter, and
wherein, in the cross section, the portion of the loading surface defined by the second small outer diameter is located closer to the radially-extending flange than the plurality of deformations.

2. The seal ring of claim 1, wherein each of the plurality of deformations is a recess in the loading surface configured to allow the load ring to squeeze into the plurality of deformations to form bonding between the seal ring and the load ring over an increased surface area to provide resistance against relative rotation between the seal ring and the load ring.

3. The seal ring of claim 1, wherein the plurality of deformations extend over 25-75% of a length of the axially-extending flange.

4. The seal ring of claim 1, wherein the dual face seal is configured to be incorporated into a dual face seal assembly to seal a rotating joint in a final drive system of a tracked-vehicle.

5. A dual face seal assembly comprising:
a first seal ring and a second seal ring each having an L-shaped cross-section, each of the first and second seal ring including an axially-extending flange and a radially-extending flange and being defined by a large outer diameter and an inner diameter, and having mutually-confronting annular seal faces and opposing loading surfaces; and
a first load ring and a second load ring, wherein each of the first and the second load rings correspond to one of the first and the second seal rings, respectively, each of the first and second load rings having an inner cylindrical surface, wherein the inner cylindrical surface of each of the first and second load rings is configured to engage and apply a force to the loading surface of the corresponding first or second seal ring to maintain the seal faces in sealing engagement,
wherein a plurality of deformations are formed in a spaced apart arrangement circumferentially around each of the respective loading surfaces in the respective axially-extending flange and forming a stepped geometry when viewed in a cross-section through the deformations where the plurality of deformations are each defined by a first small outer diameter and a portion of the loading surface is defined by a second small outer diameter greater than the first small outer diameter, and
wherein, in the cross section, the portion of the loading surface defined by the second small outer diameter is located closer to the radially-extending flange than the plurality of deformations.

6. The dual face seal assembly of claim 5, wherein when a first member surrounds and applies a compressive force to the first load ring, at least a portion of the first load ring is squeezed into the plurality of deformations in the first seal ring causing the first load ring to be deformed such that bonding between the first load ring and the first seal ring occurs over a larger surface area of the first load ring than when the compressive force is not applied.

7. The dual face seal assembly of claim 5, wherein the inner cylindrical surface of the first load ring has a constant diameter along its axial length and in an uncompressed state.

8. The dual face seal assembly of claim 5, wherein, in the cross section, the portion of the loading surface defined by the second small diameter extends over 30-70% of a length of the axially-extending flange.

9. The dual face seal assembly of claim 5, wherein, in the cross section, the plurality of deformations extend over 30-70% of a length of the axially-extending flange.

10. The dual face seal assembly of claim 5, wherein the dual face seal assembly is configured to seal a rotating joint in a final drive system of a tracked-vehicle.

11. A final drive system comprising:
a rotatable mount including a spindle;
a final drive housing configured to receive the spindle and be mounted to a frame of a machine; and
a dual face seal assembly comprising:

a first seal ring and a second seal ring each of the first and second seal rings having an L-shaped cross-section including an axially-extending flange and a radially-extending flange, each of the first and second seal rings defined by a large outer diameter and an inner diameter, and having mutually-confronting annular seal faces and opposing loading surfaces; and a first load ring and a second load ring, wherein each of the first load ring and the second load ring correspond to one of the first seal ring and the second seal ring, respectively, each of the first and second load rings having an inner cylindrical surface configured to engage and apply a force to the loading surface of the corresponding first or second seal ring to maintain the seal faces in sealing engagement, and wherein a plurality of deformations are formed in a spaced apart arrangement circumferentially around each loading surface in the respective axially-extending flange and forming a stepped geometry when viewed in a cross-section through the deformations where the plurality of deformations are each defined by a first small outer diameter and a portion of the loading surface is defined by a second small outer diameter greater than the first small outer diameter, wherein, in the cross section, the portion of the loading surface defined by the second small outer diameter is located closer to the radially-extending flange than the plurality of deformations.

12. The final drive system of claim 11, wherein the plurality of deformations extend over 25-75% of a length of the axially-extending flange.

13. The final drive system of claim 11, wherein the rotatable mount applies a compressive force to the first load ring, and wherein when the compressive force is applied, the first load ring is deformed into the plurality of deformations in the first seal ring, and wherein the compressive force causes bonding to occur over a larger surface area of the first load ring than when the first load ring is an uncompressed state.

* * * * *